(12) United States Patent
Zhou

(10) Patent No.: US 6,785,427 B1
(45) Date of Patent: Aug. 31, 2004

(54) IMAGE MATCHING USING RESOLUTION PYRAMIDS WITH GEOMETRIC CONSTRAINTS

(75) Inventor: Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 681 days.

(21) Appl. No.: 09/665,917

(22) Filed: Sep. 20, 2000

(51) Int. Cl.$^7$ ............................. G06T 3/00; G06T 11/60
(52) U.S. Cl. ..................... 382/294; 382/154; 382/240; 382/284; 382/294
(58) Field of Search ............................... 382/240, 154, 382/284, 294

(56) References Cited

U.S. PATENT DOCUMENTS

| | | | | |
|---|---|---|---|---|
| 4,973,111 A | * | 11/1990 | Haacke et al. ............... | 324/309 |
| 5,627,915 A | * | 5/1997 | Rosser et al. ............... | 382/219 |
| 5,742,710 A | * | 4/1998 | Hsu et al. .................... | 382/236 |
| 5,790,206 A | * | 8/1998 | Ju .............................. | 348/699 |
| 6,078,701 A | * | 6/2000 | Hsu et al. .................... | 382/294 |
| 6,157,747 A | * | 12/2000 | Szeliski et al. ............. | 382/284 |
| 6,192,156 B1 | * | 2/2001 | Moorby ..................... | 382/236 |
| 6,349,114 B1 | * | 2/2002 | Mory ..................... | 375/240.21 |
| 6,359,617 B1 | * | 3/2002 | Xiong ........................ | 345/848 |
| 6,646,655 B1 | * | 11/2003 | Brandt et al. ............... | 345/723 |

OTHER PUBLICATIONS

Correlation (ESSI–CNES–INRIA report Bernard Holtz 1991) (2 pgs).
Les Kitchen et al., "Gray–Level corner detection" Pattern Recognition Letters 1 (1982) 95–102.

* cited by examiner

*Primary Examiner*—Leo Boudreau
*Assistant Examiner*—Dennis Rosario-Vasquez
(74) *Attorney, Agent, or Firm*—Patent Law Group LLP; Carmen C. Cook

(57) ABSTRACT

An image matching method for matching a first image and an overlapping second image includes generating a first set of working layers of the first image and a second set of working layers of the second image. The method determines an overlap between an initial working layer of the first image and an initial working layer of the second image where the initial working layers have a smaller pixel array size and a lower image resolution than the other working layers. The method selects a feature point in the working layer of the first image and determines a position in the working layer of the second image corresponding to the feature point. The method then determines the motion parameters based on the feature point and the position in the first and second images. Finally, the method repeats the selection of a feature point using another working layer of the first image and another working layer of the second image, each of these working layers has a larger pixel array size and a higher image resolution than the initial working layers.

22 Claims, 6 Drawing Sheets

IMAGE MATCHING USING RESOLUTION PYRAMIDS WITH GEOMETRIC CONSTRAINTS

CROSS REFERENCE TO MICROFICHE APPENDIX

Appendix A which is a microfiche appendix of 1 sheet of microfiche and having a total of 19 frames, contains the pseudo code and source code for implementing the image matching method according to one embodiment of the present invention. A portion of the disclosure of this patent document contains material which is subject to copyright protection. The copyright owner has no objection to the facsimile reproduction by anyone of the patent documents or patent disclosure, as it appears in the Patent and Trademark Office patent files or records, but otherwise reserves all copyright whatsoever.

BACKGROUND OF THE INVENTION

1. Field of the Invention

The invention generally relates to digital image matching; and in particular, the present invention relates to an image matching method using resolution pyramids with geometric constraints.

2. Background of the Invention

Digital photography is becoming more popular today as digital cameras and scanners are becoming widely available. Digital images can be created either by capturing a scene using a digital camera or digitizing a traditional film-based photograph using a scanner. Digital photography has many advantages over the traditional film-based photography. One particular advantage is that digital images can be easily manipulated or edited for better presentation. Furthermore, the digital images can be readily distributed over electronic media such as the internet or electronic mail.

When a photographer captures a scene using a camera, the desired field of view may be larger than the normal field of view of the camera. The photographer could use a panoramic camera or fisheye lens to capture a wide area in a panoramic image. However, such equipment can be expensive and is unavailable to a casual photographer. Digital photography allows a panoramic image to be produced without the need of purchasing a separate panoramic camera or fisheye lenses. For example, a photographer with a digital camera may capture a series of digital pictures of a scene by rotating the camera and taking pictures with the camera pointed in a sequence of different directions. The captured images may then be stitched together to produce a panoramic picture of the scene. Of course, film-based photographs can be digitized, and the panoramic picture can be composed by stitching together the digitized images.

Presently, digital image programs are available for stitching multiple digital images together to form a panoramic picture. Exemplary programs include Ulead Cool 360™, Live Picture PhotoVista™, and MGI PhotoSuite III™. Conventional image matching programs generally use feature correspondence algorithms, which operate by matching features of two source images, to determine how to combine the two images. However, these algorithms can be very slow because the search area to find the matching points is large and the computational burden of the image matching process is great. It may take several minutes to produce a 360° panoramic picture, and often the result is not satisfactory. Therefore, it is desirable to provide more accurate image matching and to perform the imaging matching at a much faster speed.

SUMMARY OF THE INVENTION

According to an embodiment the present invention, an image matching method for matching a first image and an overlapping second image includes (a) generating a first set of working layers of the first image, the, first set of working layers including multiple working layer having successively increasing resolutions from a first working layer having the coarsest resolution to a last working layer having the finest resolution; (b) generating a second set of working layers of the second image, the second set of working layers including multiple working layer having successively increasing resolutions from a first working layer having the coarsest resolution to a last working layer having the finest resolution; (c) determining using correlation an overlap region between the first working layer of the first image and the first working layer of the second image, the overlap region being defined by translational displacement parameters only; (d) selecting the first working layer of the first image; (e) selecting multiple feature points in the first working layer of the first image; (f) determining from within multiple attention areas and using the translational displacement parameters multiple positions in the first working layer of the second image corresponding to the multiple feature points in the first image; (g) determining motion parameters based on the multiple feature points and the multiple positions, the motion parameters describing the positional relationship between the first working layer of the first image and the first working layer of the second image; (h) selecting a next working layer in the first set of working layers of the first image, the next working layer being a working layer with the next higher resolution than the first working layer; (i) selecting a second next working layer having in the same resolution as the next working layer of the first image; (j) selecting multiple feature points in the next working layer of the first image; (k) determining from within multiple attention areas and using the motion parameters multiple positions in the second next working layer of the second image corresponding to the multiple feature points in the first image; (l) determining motion parameters based on the multiple feature points and the multiple positions, the motion parameters describing the positional relationship between the next working layer of the first image and the second next working layer of the second image; and (m) selecting another next working layer in the first set of working layers of the first imaging, the next working layer being a working layer with the next higher resolution than the working layer just processed. Finally, the method repeats steps (i) to (m) using the next working layer of the first image and the second next working layer of the second image until the last working layer of the first image and the last working layer of the second image have been processed.

According to another embodiment of the present invention, the resolution pyramid of each of the images may include two or more working layers, each working layers having reduced image size and decreased resolution from the previous working layer.

The image matching method can be used to stitch together two or more images to create a panoramic picture. The use of resolution pyramids with a novel feature matching algorithm achieves computational efficiency and image matching accuracy not attainable by conventional programs. The present invention will be better understood upon consideration of the detailed description below and the accompanying drawings.

BRIEF DESCRIPTION OF THE DRAWINGS

In the present disclosure, like objects that appear in more than one figure have like reference numerals.

DETAILED DESCRIPTION OF THE PREFERRED EMBODIMENTS

In accordance with one embodiment of the present invention, an image matching method is provided for stitching together two or more images to create a panoramic picture. The image matching method of the present invention uses resolution pyramids together with a novel feature matching algorithm to quickly and accurately align the overlapped regions of two images. The use of multi-layer resolution pyramids with geometrical constraints and camera motion estimation and prediction in the image matching method of the present invention greatly reduces the computational cost of the image matching process. The image matching method of the present invention is capable of providing image matching results that are robust and accurate. The image matching method of the present invention can operate at a very fast speed, representing a significant improvement over conventional image matching programs. By using the image matching method of the present invention, panoramic pictures can be created without the need for special panoramic cameras or photographic equipment.

Figure 1:
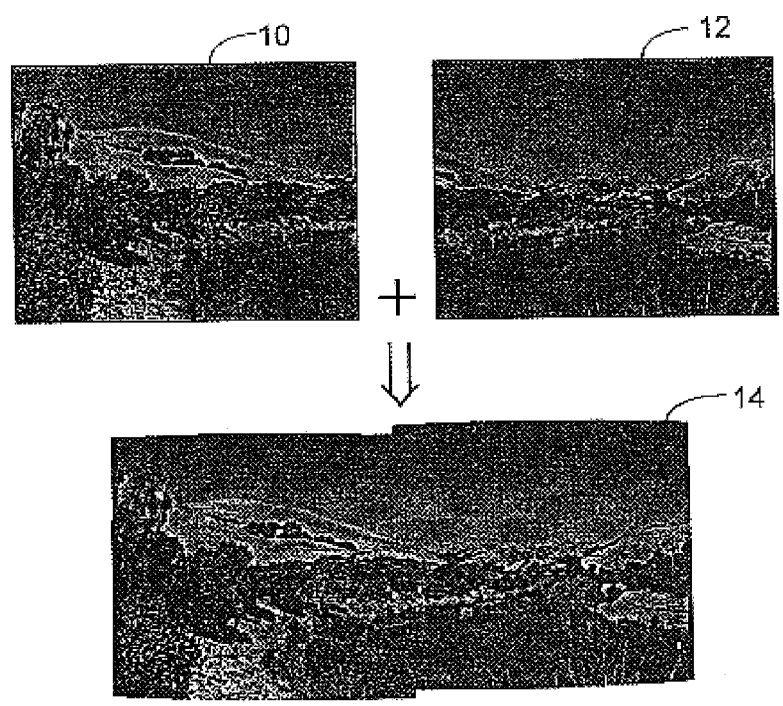
FIG. 1 illustrates the image matching process for stitching together two images according to one embodiment of the present invention.

FIG. 1 illustrates the stitching together of a left image 10 and a right image 12 to generate a wide-angle picture 14 using the image matching method according to one embodiment of the present invention. The source images 10 and 12 are digital images which can be obtained from one of several sources. For example, a digital camera can capture the images. The images can also be created by scanning film-based photographs and generating digital representations thereof. The images may be gray scale or color images. For example, each of images 10 and 12 can be a two-dimensional array of RGB (red-green-blue) or YUV pixel values representing color pixels. In one embodiment, the images are represented in Microsoft Windows™ 24-bit BITMAP format. In this format, each pixel has three adjacent bytes for Blue, Green, and Red channels respectively.

The image matching method according to the present invention requires source images with certain properties. First, all images have similar perspectives, e.g., all images are taken by a single camera that was at a fix position and turned through the desired field of view to capture the source images. Second, each pair of images includes sufficient overlap portions. In one embodiment, a pair of images ideally overlap by about 25%. Third, all the images have similar color characteristics, e.g. were taken using the same camera settings and lighting. Lastly, the images have only minor optical distortions which may be due to the lens of the camera.

Figure 9:
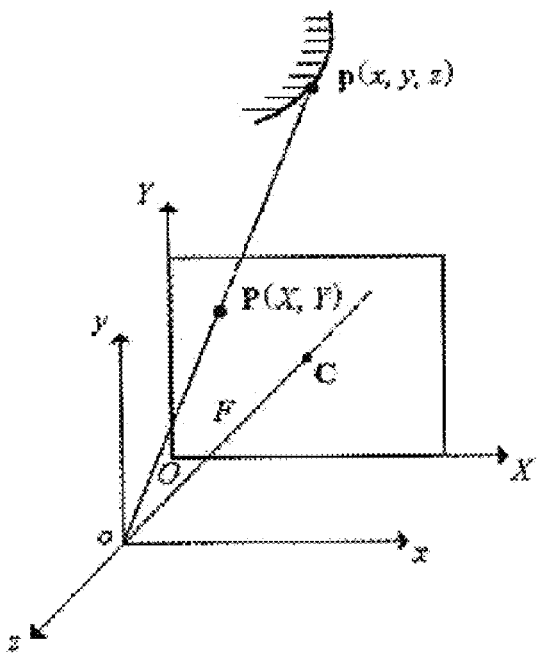
FIG. 9 is a representation of an ideal camera model.

In practice, the above identified constraints can be easily satisfied and the feature matching algorithm of the present invention can accommodate most reasonable distortions present in photographs taken with a hand-held camera. In the present description, the camera model used is a traditional pinhole camera. FIG. 9 illustrates the camera model for a pinhole camera. The camera imaging optical center is placed at the world coordinate o-xyz origin and its focal length is F. The image plane has an image size of W by H pixels, and the 2-D coordinate system O-XY has an origin at the bottom-left corner of the image plane. Therefore the principal point C is located at (W/2, H/2). The camera optical axis oC is along the negative z-axis in the world coordinate. A 3-D point p(x, y, z) projects to an image point P(X, Y), where $F=|oC|$;

$X=x/z*F+W/2$; and $Y=y/z*F+H/2$.

The camera model described above is used to provide an accurate camera calibration process for the image matching method of the present invention as will be discussed in more detail below.

Figure 2:
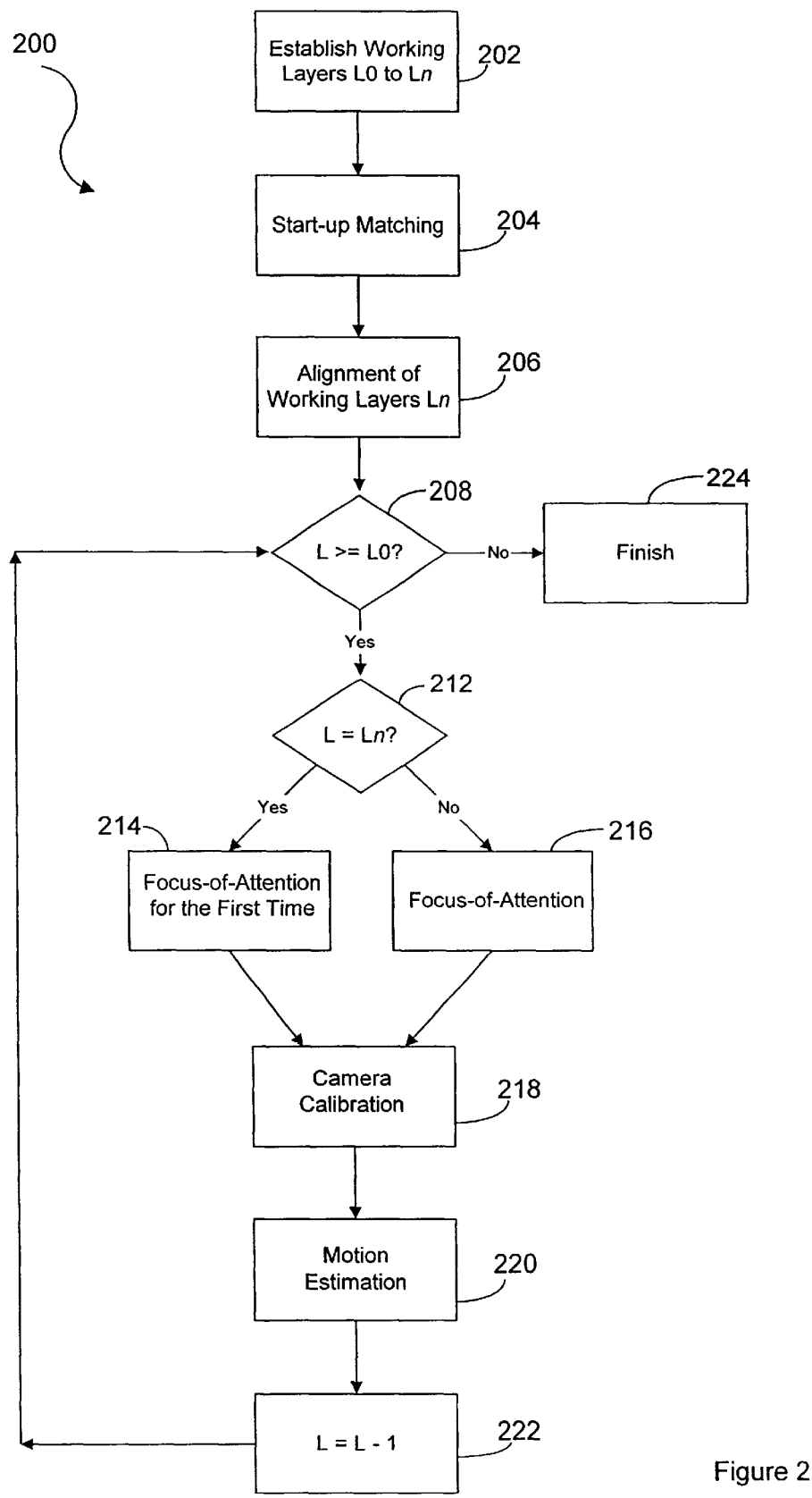
FIG. 2 is a flow chart illustrating the image matching process for two images according to one embodiment of the present invention.

In one embodiment, after the desired source images 10 and 12 are captured and selected, source images 10 and 12 are processed according to the flow chart shown in FIG. 2 to produce wide-angle picture 14. While the flow chart in FIG. 2 illustrates the process for matching two source images, the same process can be repeated for matching multiple images to form panoramic pictures in various stitching formats, including vertical, horizontal, tile or 360° stitching formats, as will be discussed in more detail below.

Figure 3:
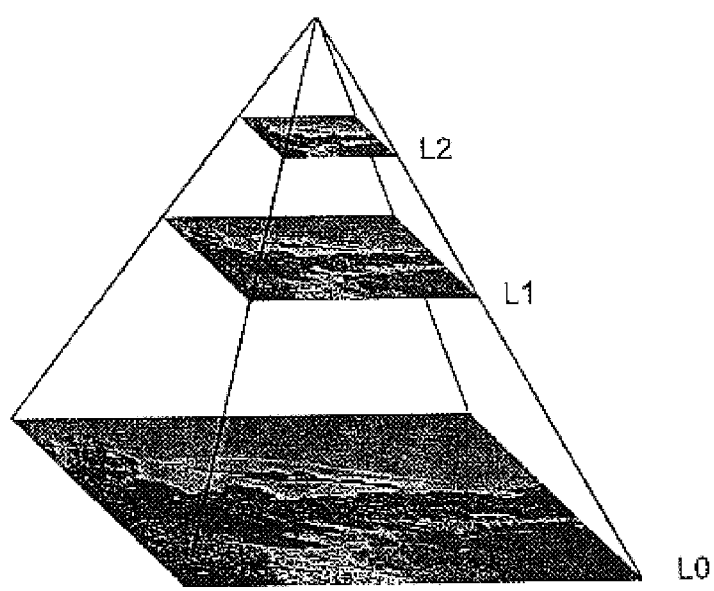
FIG. 3 illustrates a resolution pyramid used in the image matching algorithm according to one embodiment of the present invention.

Referring to FIG. 2, image matching method 200 first constructs a multi-layer resolution pyramid for each of source images 10 and 12 (step 202). In the present description, a resolution pyramid is an array of images having decreasing image sizes and decreasing degree of image resolution. An exemplary three-layer resolution pyramid is illustrated in FIG. 3. In the present description, each layer of the resolution pyramid is called a working layer.

In the present embodiment, each of source images 10 and 12 is W by H pixels. Typical dimensions are 800×600 pixels. Each pixel in each of the working layers of the resolution pyramid is calculated by averaging a 2×2 neighbor pixels of the lower layer. For color images, the R, G, and B values are separately averaged. Thus, a resolution pyramid of n layers is an array of images having the following dimensions:

Layer L0: W by H pixels;

Layer L1: W/2 by H/2 pixels;

Layer L2: W/4 by H/4 pixels;

......

Layer Ln: W/$2^n$ by H/$2^n$ pixels.

Layer L0 is the source image layer and has the finest resolution. Layer Ln has the smallest image size and the coarsest resolution. As the resolution pyramid is traversed from bottom to top, each layer of the resolution pyramid is reduced in size and resolution from the previous layer. In the present description, the image size of the images is taken to mean the size of the two-dimensional array of pixel data used to represent the images. Thus, the term "image size" in the present description is used to refer to size of the pixel data of each image and is also sometimes referred to as the pixel array size.

Step 202 of method 200 establishes the working layers, from the finest to the coarsest, of the resolution pyramids for each of source images 10 and 12 (FIG. 1). In the present embodiment, the finest layer in the resolution pyramid is chosen to be layer L0. However, in other embodiments, the finest layer used in the image matching method of the present invention can be of other sizes. The size of the finest layer is selected based on the desired size of the output image. If an output image having the same resolution as the souse image is desired, then the finest layer is L0 as shown in FIG. 3. If an output image is to have a lower resolution, then layer L1 or L2 may be suitable for use as the finest layer.

On the other hand, the coarsest layer, Ln, is the layer on which the feature matching algorithm of the present invention begins operation. Thus, layer Ln is selected to have a size small enough for efficient computation. In one embodiment, layer Ln has a dimension of around 64×64 pixels. In another embodiment, layer Ln has a dimension between 32×32 pixels and 64×64 pixels. The number of working layers is chosen to generate a layer Ln having the suitable dimensions. In one embodiment, five working layers are generated for each source image.

As will be realized in the description below, image matching method 200 uses the coarse-to-fine working layers of the resolution pyramids, in the feature matching algorithm of the present invention. At each layer of processing, a set of motion correspondence parameters are estimated. The newly estimated parameters are used to predict the search areas of the feature matching algorithm in the next layer (i.e. the next finer layer). The estimations are refined at each working layer until the finest layer is reached. The use of the resolution pyramids in the image matching method of the present invention achieves appreciable reduction in the gross computation cost.

Figure 4:
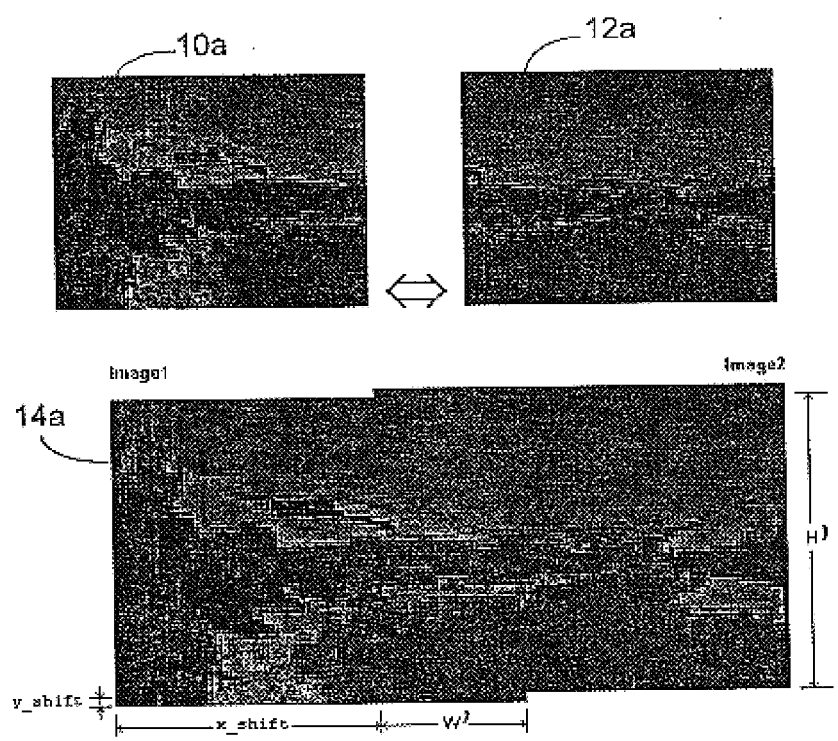
FIG. 4 illustrates the coarse alignment of two images using the coarsest image working layers.

After the resolution pyramids are established for source images 10 and 12, image matching method 200 then performs a coarse alignment (step 204) of the two images using a local correlation routine. Start-up matching step 204 (FIG. 2) uses the result of the coarse alignment process to determine the overlap regions of the two images. The correlation operation of step 204 is performed on layer Ln, the layer with the lowest resolution. Thus, the alignment process can be performed very quickly. FIG. 4 illustrates the result of the coarse alignment process of a working layers of images 10 and 12.

The start-up matching step 204 of method 200 can be implemented using any correlation techniques known in the art. For example, a description of image matching by correlation can be found in "Digital Image Processing" by R. Gonzales and R. Woods, Addison-Wesley Publishing Co., Inc., 1992, pages 583–586. Basically, correlation is a technique for matching two overlapping images by finding, for an observed region on the first image, the corresponding region on the second image. Correlation is performed by selecting an observed region defined by a window in the first image. Then, the second image is searched by moving the window around the entire image area and computing the correlation between the observed region and each of the areas in the second image. The similarity between two areas are determined using correlation criteria and a match between the two areas is found when the correlation yields the largest correlation value. When a match between the observed region and the match region is found, the distance from the observed point and its match is called "disparity" having units in pixels.

Referring to FIG. 4, step 204 of method 200 performs coarse alignment on working layer Ln of image 10 (denoted layer 10a) and working layer Ln of image 12 (denoted layer 12a). In the present embodiment, the correlation method is performed by moving layer 12a (or a window area from layer 12a) to all possible positions on layer 10a. Because both layers 10a and 12a have a low resolution, the disparity between the images is assumed to be translational only. That is, rotational, wrap, or other deformations between the two images are not considered. By comparing the computed correlation function, the overlapped region of layers 10a and 12a is determined as shown in FIG. 4. The correlation process of step 204 yields a disparity of x_shift in the x-axis and a disparity of y_shift in the y-axis. The overlap regions between images 10 and 12 has a dimension of W'×H'.

In another embodiment, the correlation process of method 204 further includes a brightness normalization operation to account for the fact that source images 10 and 12 may be captured at different times with different exposure parameters. If the overlapping area between layer 10a and layer 12a is W'×H', then an average brightness, denoted mean1, for the overlapping area in layer 10a is computed. Similarly, an average brightness, denoted mean2, for the overlapping area in layer 12a is computed. To compute the overlapped pixel value difference between an observed region and a matching region, the R, G, B values of an observed pixel and a matching pixel are normalized by computing the following for each pixel and accumulating the values over the entire overlapping area:

$$((Pixel1.Blue-mean1)-(Pixel2.Blue-mean2))/(W'*H')$$

$$((Pixel1.Green-mean1)-(Pixel2.Green-mean2))/(W'*U')$$

$$((Pixel1.Red-mean1)-(Pixel2.Red-mean2))/(W'*H').$$

By accumulating absolute values of above entries, a larger result means the overlap region in one image is unlike its corresponding area in the other image. The best overlap position must be corresponding to a minimum correlation product. Thus, the estimated disparity (x_shift, y_shift) corresponds to a minimum accumulated pixel difference. The above-described operation is a conventional image correlation process and other known image correlation process can also be used.

After the coarse alignment process of step 204 is completed, a fine alignment process begins. Referring to FIG. 2, the fine alignment process is a recursive process (steps 208 to 222) whereby each of the working layers L0 to Ln is processed in sequence from the coarsest resolution layer to the finest resolution layer. The fine alignment process starts (step 206) by selecting the coarsest layer Ln as the current working layer. Method 200 first determines whether the finest layer (e.g., layer L0) has been processed. If the current working layer L is greater than or equal to layer L0, then the finest layer has not been processed, and the process proceeds to step 212. If the current working layer is less then layer L0, then all the layers have been processed, and method 200 terminates (step 224). After step 208, method 200 determines whether the current working layer is the coarsest layer Ln (step 212). If the current working layer is layer Ln, then method 200 proceeds to step 214 for performing a focus-of-attention process for the first time. If the current working layer is not layer Ln, then method 200 proceeds to step 216 for performing the focus-of-attention process. After either of the focus-of-attention steps (step 214 or 216), method 200 performs a camera calibration process (step 218) and a motion estimation process (step 220). After the motion estimation process, method 200 has obtained the motion correspondence parameters of the current working layer for each of source images 10 and 12. Method 200 then decrements the current working layer to the next layer having a higher resolution and a larger image size (step 222). Method 200 repeats steps 208 to 222 for processing the next current working layer L using the estimated motion parameters obtained from the previous layer. Because the fine alignment process of each working layer is performed with progressively higher accuracy than the previous layer, method 200 of the present invention is able to perform the fine alignment process very quickly and achieving efficient results not observed in the conventional processes.

Figure 5:
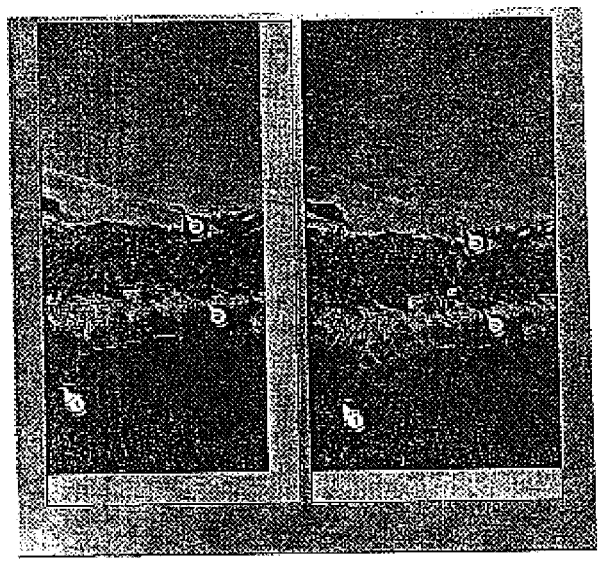
FIG. 5 illustrates the selection and matching of feature points on a left image and a right image according to one embodiment of the present invention.

The operation of the focus-of-attention steps 214 and 216 will now be described in further detail. The focus-of-attention steps 214 and 216 of method 200 operate to select feature points from the current working layer of the first image (e.g., layer 10a of FIG. 4) and then find the corresponding feature points in the current working layer of the second image (e.g., layer 12a of FIG. 4). FIG. 5 illustrates the result of the focus-of-attention step for selecting and matching three features in the left and right images.

In general, an imaging matching method operates to derive the spatial relationship between the two images and then stitch the images together seamlessly. In any image matching method, the most critical process step in matching two partially overlapped images is the selection of feature points in one image and the search of the corresponding feature points in the other image. Typically, the search process is very slow because the search for the corresponding points has to be conducted in a large candidate area in the second image. In accordance with the present invention, a novel feature matching algorithm is provided to facilitate fast and accurate feature matching between two images.

Focus-of-attention step 214 is only performed for the first time on the coarsest working layer Ln. Step 214 first selects a number of feature points within the overlap region in the left image (i.e. layer 10a in FIG. 4). As mentioned above, the overlap region between the two images is determined in start-up matching step 204 and is denoted as the W'×H' area in FIG. 4. The feature points are selected by detecting "corners" in the image. In the present description, a "corner" in an image has a meaning well known in the art of image processing and is used to refer to an image point where both the pixel brightness and edge orientation change rapidly.

In the present embodiment, the corner detection algorithm used is a modified Kitchen-Rosenfeld's operator. However, other known corner detection algorithm can also be used to detect corners in layer 10a for defining the feature points of interest. A description of the Kitchen-Rosenfeld's operator can be found in *"Gray-Level Corner Detection,"* by L. Kitchen and A. Rosenfeld, Pattern Recognition Letters, 95–102, December, 1982, which is incorporated herein by reference in its entirety. The original Kitchen-Rosenfeld algorithm is applicable for detecting corners in gray-level images and the algorithm has been modified for detecting corners in a 24-bit color image. In operation, the Kitchen-Rosenfeld operator calculates a cornerness value k, for a gray scale image, at each position in an image:

$$k=(I_{xx}I_y^2+I_{yy}I_x^2-I_{xy}I_xI_y)/(I_x^2+I_y^2),$$

where $I=I(x, y)$ is a two-dimensional image function. The derivatives $I_x=\partial I/\partial x$, $I_y=\partial I/\partial y$, $I_{xx}=\partial^2 I/\partial x^2$, $I_{yy}=\partial^2 I/\partial y^2$, $I_{xy}=\partial^2 I/\partial x \partial y$. A large value of k means a large likelihood that an image point is an image corner. The algorithm extracts image corners by examining and identifying local maxima in the image. For color images, the cornerness value is calculated for each of blue, green, and red channels respectively. Then a global cornerness value k is a simple sum of the k values for each of the three channels.

Figure 6:
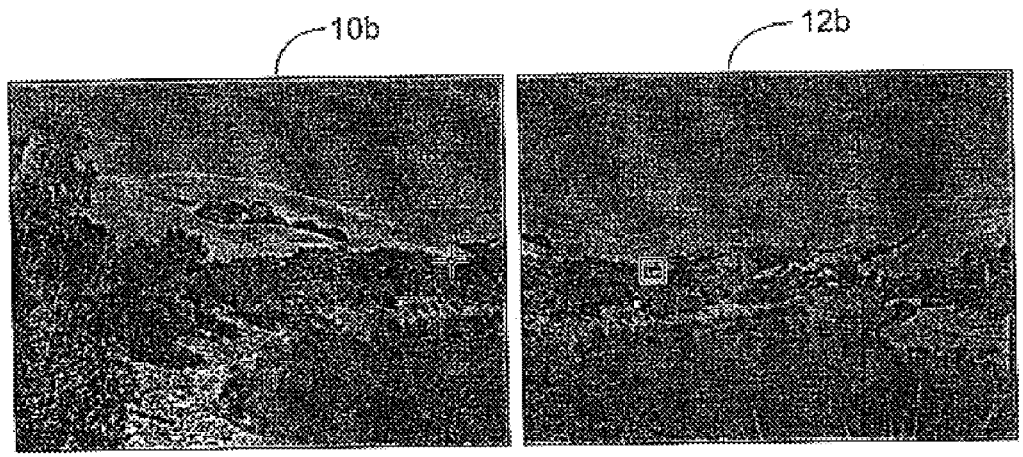
FIG. 6 illustrates the focus-of-attention process according to one embodiment of the present invention.

FIG. 6 illustrates the selection of a feature point in left image 10b as indicated by the cross-hair symbol. In general, for best results, three or more features points are used. Furthermore, in order to obtain the best motion estimation results in step 220 later on, the feature points should be spatially well-distributed in the overlapping area. In one embodiment, the feature points, or detected corners, must meet the following criteria: (1) the cornerness value k must be greater than a predefined global threshold. This global threshold is chosen to be a small value so that all distinct corner features can be kept for further processing but the weak corners caused by image noises or other factors are eliminated; (2) the feature points are evenly distributed in the candidate area, that is the overlap region; and (3) the feature points are spaced apart from each other with a proper distance. FIG. 5 illustrates the selection of three feature points in the left image meeting the criteria stated above.

Once the feature points are selected in the left image 10b (FIG. 6), step 214 then calculates the possible matching position in the other image (image 12b) according to known motion parameters. This process is called "prediction." In step 214, because the focus-of-attention process is performed for the first time, the only available motion parameters are from start-up matching step 204. Thus, motion parameters such as x_shift and y_shift are used in predicting the possible matching position in FIG. 12b. For example, referring to FIG. 6, assume that the selected feature point is denoted A1 and is located at coordinate (x1, y1). From start-up matching step 204, it is known that the right image 12b is located at (Δx, Δy) relative to the left image 10b. Therefore, the focus-of-attention process (step 214) predicts the corresponding matching point A2 in image 12b to be located at (x1−Δx, y1−Δy).

Because the prediction process is not expected to be absolutely accurate, step 214 selects an area about the predicted point, called an attention area, to search for the matching corresponding point. In the present embodiment, a square area of 15×15 pixels is selected as the attention area as illustrated by the square box in image 12b of FIG. 6. To find the corresponding feature point in image 12b, searching is performed within the attention area only for locating the best match point. The searching operation is performed in the same manner as the correlation process described above with respect to start-up matching step 204. According to the present invention, because the searching is only performed in a small attention area, as opposed to the entire overlapped region, the focus-of-attention process can very quickly find the matching feature points.

For the purpose of performing the focus-of-attention step 214 of method 200, the algorithm assumes that the motion between the two images is translational only. Although the translational-only assumption is adequate for a first-time prediction performed on the coarsest resolution layer, this assumption does not hold when the algorithm proceeds to match feature points in a finer resolution layer. Specifically, for fine-resolution working layers, rotational as well as geometrical distortions are taken into account. Therefore, focus-of-attention step 214 is only for aligning the coarsest layer Ln, and focus-of-attention step 216 is for aligning the subsequent working layers.

After focus-of-attention step 214 is performed, method 200 proceeds to camera calibration step 218 and motion estimation step 220. After steps 218 and 220, a set of motion correspondence parameters for images 10b and 12b (FIG. 6) is derived as will be discussed in more detail below. Method 200 then decrements the working layer (step 222) to the next working layer, Ln−1 for each of images 10 and 12. The fine alignment process proceeds with the focus-of-attention step 216 as long as layer Ln−1 is not the last layer in the resolution pyramids.

Focus-of-attention step 216 performs feature matching for working layers other than the coarsest working layer. Step 216 starts by selecting feature points, or corners, in the same manner as described above with reference to step 214. However, the prediction process of step 216 is based on the latest geometrical relationships derived from the previous layer. Because the fine alignment process of method 200 is recursive, each iteration of the feature matching algorithm of step 216 is performed using the motion parameters (including camera settings and ego-motion parameters) obtained from the previous layer. Therefore, the motion parameters are refined layer by layer until the parameters converge to a final result in the finest working layer.

In the prediction process of step 216, assume the position of one exemplary feature point in the left image is $A_1(x_1, y_1)$, and the camera focal length is F (in pixels) as determined in camera calibration step 218 to be discussed below. Furthermore, assume that a rotation matrix R derived from motion estimation step 220 defines the rotational relationship of the two images. If the image center of the left image 10b is $(x_{01}, y_{01})$, and the image center of the right image 12b is $(x_{02}, y_{02})$. Then, a vector $a_1$ and a vector $a_2$ define the positions of the corresponding feature points in the left image and the right image as:

$$a_1 = [x_1 - x_{01}, y_1 - y_{01}, -F]^T; \text{ and}$$

$$a_2 = [x_2 - x_{02}, y_2 - y_{02}, -F]^T.$$

Then, the predicted feature point $A_2(x_2, y_2)$ in the right image is given by the solution to the following equation:

$$a_1/\|a_1\| = R \cdot a_2/\|a_2\|.$$

Based on the predicted point, an attention area is established. In the present embodiment, a 15×15 pixel area is used but other sizes may also be suitable. Step 216 then performs a correlation process similar to that described above with reference to start-up matching step 204 to match the features in the attention area. In the correlation process of step 216, a moving mask size of 8×8 pixels is used for finding the best match position within the attention area.

Camera calibration step 218 of method 200 is a mathematical procedure for determine the internal parameters of the camera. In the present embodiment, the camera model has been simplified to be represented by just one parameter—the focal length F. The focal length can be automatically estimated from the selected feature points using a rigid constraint. The constraint used requires that the viewing angle to two features does not change if the camera optical center remains fixed. By using this constraint, step 218 of the present invention simplifies the calculation process and yet provides accurate result.

Figure 7A:
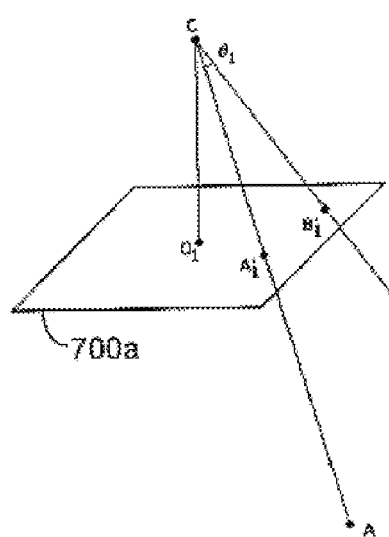
FIGS. 7a and 7b illustrate the basic models of the camera viewing process used in the camera calibration step according to one embodiment of the present invention.
Figure 7B:
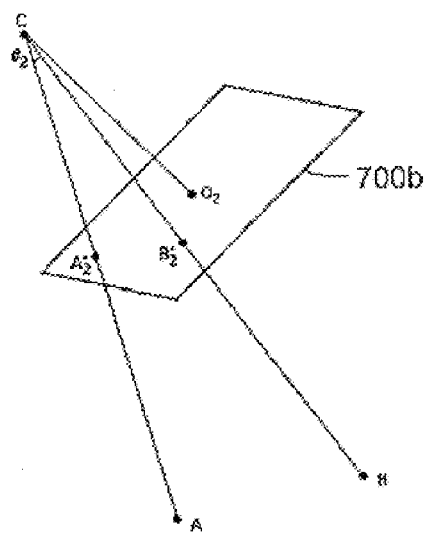

FIGS. 7a and 7b illustrate the basic models of the camera viewing process used in the camera calibration step 218 of method 200. FIGS. 7a and 7b illustrate the camera viewing process of two points A and B being captured on different image planes 700a and 700b. In FIGS. 7a and 7b, point C is the camera optical center and points $O_1$ and $O_2$ are the imaging principal points (or called the image centers) for image plane 700a and 700b respectively. The lines $CO_1$ and $CO_2$ are perpendicular to respective image planes 700a and 700b. Points A and B are two arbitrary rigid feature points in the real 3-dimensional world. Points $A_1'$ and $B_1'$ are images of points A and B in image plane 700a and points $A_2'$ and $B_2'$ are images of points A and B in image plane 700b. The locations of $A_1'$, $B_1'$, $A_2'$ and $B_2'$ are known since they are determined by the feature matching algorithm of the focus-of-attention steps 214 and 216. Assuming the camera optical center C is the same for both images (generally, typical movement of a hand-held camera is insignificant when A and B are distant from the camera), ABC is a fixed triangle. Therefore the angle ∠ACB in FIGS. 7a and 7b is the same and:

$$\theta_1 = \theta_2.$$

This equality condition is the fundamental equation used for camera calibration step 218.

In step 218, if there were N pairs of matched feature points available for the two images, the calibration algorithm tries to find an optimal focal length F which provides the best fitting for all of $(N^2-N)/2$ angles. The initial guess of the focal length lies in a large range $[F_{min}, F_{max}]$. A golden section searching method is applied to find the best value. A description of the golden section searching method can be found in "Numerical Recipes in C: The Art of Scientific Computing," by W. Press, S. Teukolsky, W. Vetterling, and B. Flannery, Fifth Edition, Cambridge University Press, 1992, pages 397–402, which is incorporated herein by reference in its entirety. Using the golden section searching method, the optimal focal length is determined by optimizing the following criterion:

$$\Sigma w_{dist} \cdot |\theta_{1-\theta 2}| \to \min,$$

where $w_{dist}$ is the weight coefficient multiplied by the difference of each angle for each pair of feature points. The weight coefficient $w_{dist}$ is given by:

$$w_{dist} |CA_1'| + |CB_1'| + |CA_2'| + |CB_2'|$$

The use of the weight coefficient ensures that the searching process will converge and the focal length F can be accurately determined.

After determining the focal length, method 200 proceeds to the motion estimation step 220. The motion estimation step 220 determines the relative position or orientation of images 10 and 12. In other words, motion estimation step 220 determines the motion of the camera in the two time instants when images 10 and 12 were captured. Motion estimation step 220 calculates the rotation matrix R by solving a set of linear equations based on the matched feature points.

Figure 8:
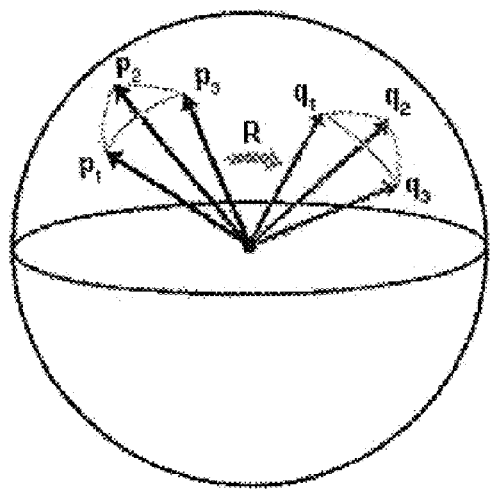
FIG. 8 illustrates the motion estimation process according to one embodiment of the present invention.

Step 220 uses a robust algorithm to improve the reliability of the motion estimation algorithm and remove false matches. FIG. 8 illustrates the image process model used for the motion estimation step 220 of the present invention. As described above in reference to the camera model, the camera motion is assumed to be rotation only. To estimate the rotation matrix R, a Singular Value Decomposition (SVD) method well known in the art is applied. The SVD method is described as follows.

If $q_i$ and $p_i$ (i=1, ..., N) are a set of unit vectors in 3D, and $$q_i = R \cdot p_i.$$

Then, the SVD method optimizes the average error by:

$\Sigma(q_i-Rp_i)^2 \to \min.$

Let $H=\Sigma q_i \cdot p_i^T$ where H is a 3×3 orthogonal matrix. The singular value decomposition of H is given by:

$$H=UAV^T.$$

Thus, the rotation matrix R is given by:

$$R=VU^T.$$

However, the original SVD method described above is easily affected by mismatches. To avoid convergence failure in the computation, a robust method is used. Thus, the above criterion is changed to $$\Sigma\text{median } (q_i-Rp_i)^2 \to \min,$$

where the average error is replaced by a median error. In another embodiment, the median does not have to be the exact "median." Instead, other alternatives, such as M-estimates, L-estimates, or R-estimates, can be used for efficiency considerations. Some examples of those robust estimators can be found in "Numerical Recipes in C: The Art of Scientific Computing," by W. Press, S. Teukolsky, W. Vetterling, and B. Flannery, Fifth Edition, Cambridge University Press, 1992, pages 699–706. Because the median error is usually more robust than the average error, motion estimation step 220 uses the median error as the motion estimation criterion. In one embodiment, the 3rd smallest error is approximately the median error and the $3^{rd}$ smallest error is used in step 220 for motion estimation. Thus, the $3^{rd}$ smallest error is found by computing:

$$\epsilon_i=(q_i-Rp_i)^2, i=1, \ldots, N.$$

By letting $\epsilon_i \to \min$, all values of $\epsilon_i$ are sorted in an increasing order and the $3^{rd}$ smallest value $\epsilon_{i0}$ is taken as the best measurement of the median error.

As described above, after the motion estimation step 220 is completed for one working layer, method 200 proceeds to decrement the working layer to the next finer resolution working layer (step 222). The fine alignment process (steps 208–222) proceeds with the next working layer using the updated motion correspondence parameters derived from the previous layer. The process of method 200 continues until all of the layers, including layer L0, are processed. After layer L0 is processed, step 222 causes the next working layer to become L−1 which is not greater than or equal to layer L0 (step 208). Then, method 200 terminates (step 224).

The image matching method of the present invention makes use of resolution pyramids and camera motion estimation and prediction to improve the stitching speed and achieves ten to twenty times speed improvement over the conventional imaging programs. The imaging method of the present invention is also more robust and accurate than conventional imaging programs.

Figure 10:
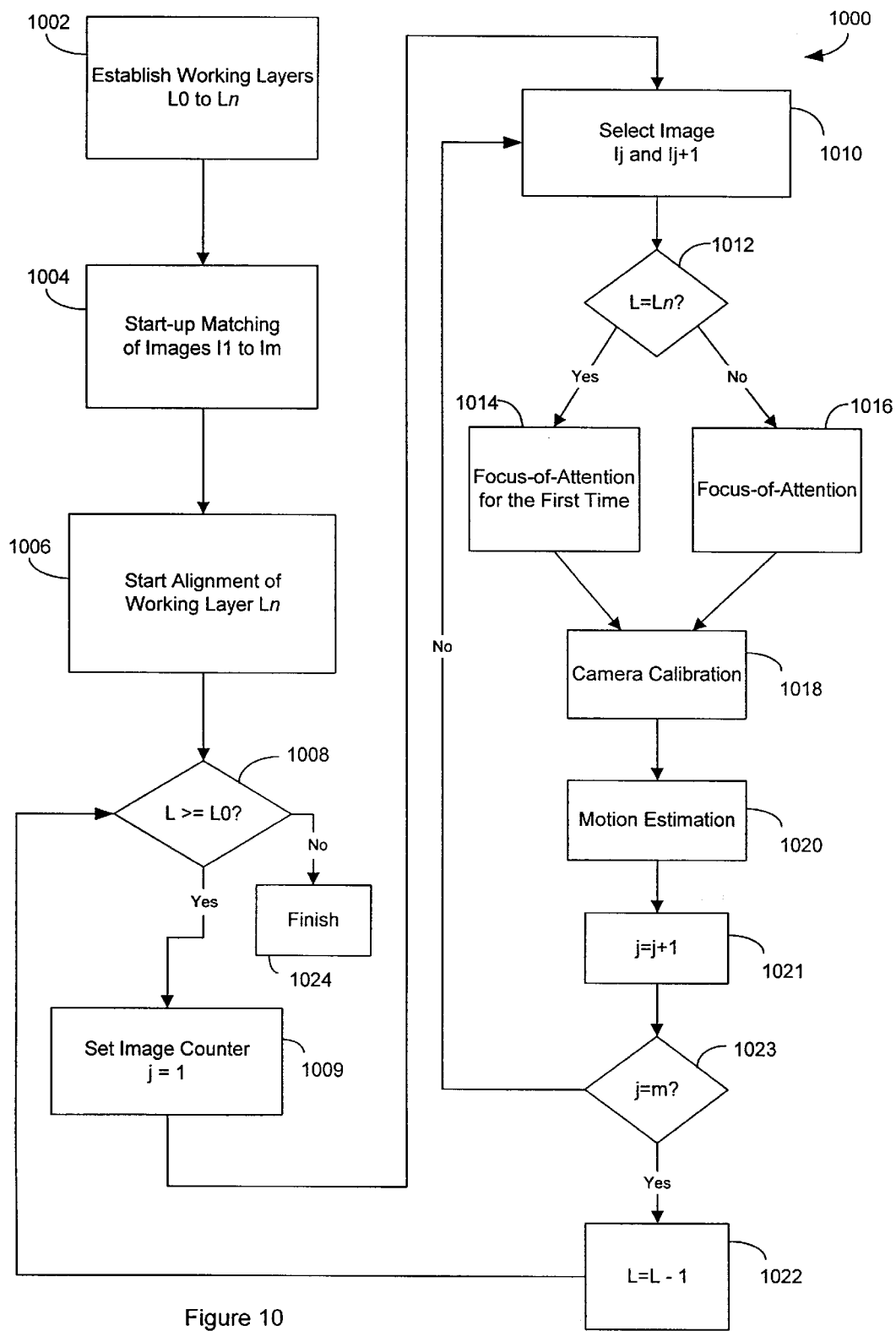
FIG. 10 is a flow chart illustrating the image matching process for stitching m images in a horizontal or vertical stitch format according to one embodiment of the present invention.

The descriptions above describe the operation of the image matching method of the present invention with respect to stitching together of two images. Of course, the image matching method of the present invention can be extended to the stitching of multiple images to create wide-angle and 360° panoramic digital pictures. The method of the present invention can be used to create panoramic pictures both in a horizontal stitch style, a vertical stitch style, a tile stitch style, and a 360-degree stitch style. In the case when multiple images are stitched together, the image matching method performs matching on a working layer for all of the images first before moving on to the next working layer. FIG. 10 illustrates the flow chart of the image matching process for m overlapping images in n working layers. The flow chart in FIG. 10 is applicable for stitching images in the horizontal and the vertical stitch style. One of ordinary skill in the art would know how to modify the flow chart in FIG. 10 to carry out the image matching method of the present invention to generate a "tile" or a "360-degree" panoramic image.

The image matching method 1000 of FIG. 10 is similar to method 200 of FIG. 2 except for the iteration process for processing m images. In FIG. 10, image matching method 1000 starts by establishing the working layers L0 to Ln for each of the m images (step 1002). Then, a coarse alignment process (start-up matching step 1004) is performed to determine the overlapping regions of the m images. The fine alignment process proceeds by selecting the coarsest working layer Ln as the current working layer (step 1006). After determining whether the finest working layer have been processed (step 1008), method 1000 proceeds to select the first two images for fine alignment. First, an image counter j is initialized to a value of 1 (step 1009). Then, adjacent images j and j+1 are selected (step 1010). Of course, if the finest layer L0 has been processed, then step 1008 proceeds to step 1024 where method 1000 terminates. After selecting the first pair of images (step 1010), method 1000 determines whether the coarsest working layer Ln is being operated on (step 1012). If the current working layer is layer Ln, then the method proceeds to a focus-of-attention operation for the first time (step 1014). If the working layer is a not layer Ln, then the focus-of-attention step 1016 is used. After the focus-of-attention operation, method 1000 proceeds to perform a camera calibration step 1018 and a motion estimation step 1020. At this point, the fine alignment process has operated on the working layers of first two source images. Method 1000 proceeds to operate on the working layers of the next two images until all m images have been processed. At step 1021, the image counter j is incremented by 1. Then, method 1000 determines whether the last image m has been processed (step 1023). If not, then, method 1000 repeats at step 1010 where the next two adjacent images are selected. When the working layers of the m images have been process, then method 1000 increments the working layer to the next finer resolution level (step 1022). Method 1000 then repeats at step 1008 for processing the working layers for all m images at this resolution level. Method 1000 terminates when the finest working layer L0 of the m images have been processed.

Appendix A includes a listing of the pseudo and source code for implementing the image matching method according to one embodiment of the present invention. Specifically, the class Cimage is provided for accepting a bitmap image format for use in the image matching method according to one embodiment of the present invention.

The above detailed descriptions are provided to illustrate specific embodiments of the present invention and are not intended to be limiting. Numerous modifications and variations within the scope of the present invention are possible. For example, in the present description, the feature points are selected from a left image and the corresponding matching feature points are searched for in the right image. Of course, the method of the present invention can also be applied by selecting the feature points from any one of the two images to be matched, such as the right image. The present invention is defined by the appended claims.

I claim:

1. A method for matching a first image to a second image, said first image overlapping said second image, comprising:

(a) generating a first set of working layers of said first image, said first set of working layers comprising a plurality of working layers having successively increasing resolutions from a first working layer having the coarsest resolution to a last working layer having the finest resolution;

(b) generating a second set of working layers of said second image, said second set of working layers comprising a plurality of working layers having successively increasing resolutions from a first working layer having the coarsest resolution to a last working layer having the finest resolution;

(c) determining using correlation an overlap region between said first working layer of said first image and said first working layer of said second image, said overlap region being defined by translational displacement parameters only;

(d) selecting said first working layer of said first image;

(e) selecting a plurality of feature points in said first working layer of said first image;

(f) determining from within a plurality of attention areas and using the translational displacement parameters a plurality of positions in said first working layer of the second image corresponding to said plurality of feature points in said first image;

(g) determining motion parameters based on said plurality of feature points and said plurality of positions, said motion parameters describing the positional relationship between said first working layer of said first image and said first working layer of said second image;

(h) selecting a next working layer in said first set of working layers of said first image, the next working layer being a working layer with the next higher resolution than said first working layer;

(i) selecting a second next working layer in said second set of working layers of said second image, the second next working layer having the same resolution as said next working layer of said first image;

(j) selecting a plurality of feature points in said next working layer of said first image;

(k) determining from within a plurality of attention areas and using the motion parameters a plurality of positions in said second next working layer of the second image corresponding to said plurality of feature points in said first image;

(l) determining motion parameters based on said plurality of feature points and said plurality of positions, said motion parameters describing the positional relationship between said next working layer of said first image and said second next working layer of said second image;

(m) selecting another next working layer in said first set of working layers of said first imaging, the next working layer being a working layer with the next higher resolution than the working layer just processed; and (n) repeating (i) to (m) using said next working layer of said first image and said second next working layer of said second image until said last working layer of said first image and said last working layer of said second image have been processed.

2. The method of claim 1, wherein said selecting a plurality of feature points in said first working layer and said selecting a plurality of feature points in said next working layer each comprises:

selecting a plurality of image points in the respective working layer of said first image wherein a pixel brightness and an edge orientation of each of said image points change rapidly.

3. The method of claim 1, wherein said selecting a plurality of feature points in said first working layer and said selecting a plurality of feature points in said next working layer each comprises:

selecting a plurality of image corners in the respective working layer of said first image.

4. The method of claim 1, wherein said determining a plurality of positions in said first working layer of said second image and said determining a plurality of positions in said second next working layer of said second image each comprises:

calculating a plurality of predicted positions in the respective working layer corresponding to each of said plurality of feature points;

selecting a plurality of search areas as said plurality of attention areas, each search area being associated with and surrounding one of said plurality of predicted positions; and searching within each of said plurality of search areas for the position corresponding to the respective one of said plurality of feature points.

5. The method of claim 4, wherein each of said plurality of search areas is a 15×15 pixels area.

6. The method of claim 4, wherein said calculating a plurality of predicted positions in the respective working layer corresponding to each of said plurality of feature points comprises:

calculating each of said plurality of predicted positions in said first working layer of said second image based on said translational displacement parameters; and calculating each of said plurality of predicted positions in said second next working layer of said second image based on said motion parameters.

7. The method of claim 6, wherein said calculating each of said plurality of predicted positions in said second next working layer of said second image based on said motion parameters:

calculating said plurality of predicted positions based on a focus length and a rotational relationship between said next working layer of said first image and said second next working layer of said second image.

8. The method of claim 1, wherein said determining motion parameters comprises:

determining a focal length of said first image and said second image based on said plurality of feature points and said plurality of positions.

9. The method of claim 1, wherein said determining motion parameters comprises:

determining a rotation matrix indicative of a rotational relationship between said next working layer of said first image and said second next working layer of said second image, wherein the rotation matrix is determined using singular value decomposition by optimizing the median error.

10. The method of claim 1, wherein said first image overlaps said second image by 25 percent.

11. The method of claim 1, wherein each of said first working layers of said first image and said second image has a pixel array size between 32×32 pixels and 64×64 pixels.

12. A computer program for matching a first image to a second image, said first image overlapping said second image, embodied in a computer readable medium, the computer program comprising instructions for:

(a) generating a first set of working layers of said first image, said first set of working layers comprising a plurality of working layers having successively increasing resolutions from a first working layer having the coarsest resolution to a last working layer having the finest resolution;

(b) generating a second set of working layers of said second image, said second set of working layers comprising a plurality of working layers having successively increasing resolutions from a first working layer having the coarsest resolution to a last working layer having the finest resolution;

(c) determining using correlation an overlap region between said first working layer of said first image and said first working layer of said second image, said overlap region being defined by translational displacement parameters only;

(d) selecting said first working layer of said first image;

(e) selecting a plurality of feature points in said first working layer of said first image;

(f) determining from within a plurality of attention areas and using the translational displacement parameters a plurality of positions in said first working layer of the second image corresponding to said plurality of feature points in said first image;

(g) determining motion parameters based on said plurality of feature points and said plurality of positions, said motion parameters describing the positional relationship between said first working layer of said first image and said first working layer of said second image;

(h) selecting a next working layer in said first set of working layers of said first image, the next working layer being a working layer with the next higher resolution than said first working layer;

(i) selecting a second next working layer in said second set of working layers of said second image, the second next working layer having the same resolution as said next working layer of said first image;

(j) selecting a plurality of feature points in said next working layer of said first image;

(k) determining from within a plurality of attention areas and using the motion parameters a plurality of positions in said second next working layer of the second image corresponding to said plurality of feature points in said first image;

(l) determining motion parameters based on said plurality of feature points and said plurality of positions, said motion parameters describing the positional relationship between said next working layer of said first image and said second next working layer of said second image;

(m) selecting another next working layer in said first set of working layers of said first imaging, the next working layer being a working layer with the next higher resolution than the working layer just processed; and (n) repeating (i) to (m) using said next working layer of said first image and said second next working layer of said second image until said last working layer of said first image and said last wording layer of said second image have been processed.

13. The computer program of claim 12, wherein said selecting a plurality of feature points in said first working layer and said selecting a plurality of feature points in said next working layer each comprises:

selecting a plurality of image points in the respective working layer of said first image wherein a pixel brightness and an edge orientation of each of said image points change rapidly.

14. The computer program of claim 12, wherein said selecting a plurality of feature points in said first working layer and said selecting a plurality of feature points in said next working layer each comprises:

selecting a plurality of image corners in the respective working layer of said first image.

15. The computer program of claim 12, wherein said determining a plurality of positions in said first working layer of said second image and said determining a plurality of positions in said second next working layer of said second image each comprises:

calculating a plurality of predicted positions in the respective working layer corresponding to each of said plurality of feature points;

selecting a plurality of search areas as said plurality of attention areas, each search area being associated with and surrounding one of said plurality of predicted positions; and searching within each of said plurality of search areas for the position corresponding to the respective one of said plurality of feature points.

16. The computer program of claim 15, wherein each of said plurality of search areas is a 15×15 pixels area.

17. The computer program of claim 15, wherein said calculating a plurality of predicted positions in the respective working layer corresponding to each of said plurality of feature points comprises:

calculating each of said plurality of predicted positions in said first working layer of said second image based on said translational displacement parameters; and calculating each of said plurality of predicted positions in said second next working layer of said second image based on said motion parameters.

18. The computer program of claim 17, wherein said calculating each of said plurality of predicted positions in said second next working layer of said second image based on said motion parameters:

calculating said plurality of predicted positions based on a focus length and a rotational relationship between said next working layer of said first image and said second next working layer of said second image.

19. The computer program of claim 12, wherein said determining motion parameters comprises:

determining a focal length of said first image and said second image based on said plurality of feature points and said plurality of positions.

20. The computer program of claim 12, wherein said determining motion parameters comprises:

determining a rotation matrix indicative of a rotational relationship between said next working layer of said first image and said second next working layer of said second image, wherein the rotation matrix is determined using singular value decomposition by optimizing the median error.

21. The computer program of claim 12, wherein said first image overlaps said second image by 25 percent.

22. The computer program of claim 12, wherein each of said first working layers of said first image and said second image has a pixel array size between 32×32 pixels and 64×64 pixels.

* * * * *